Figure 1:
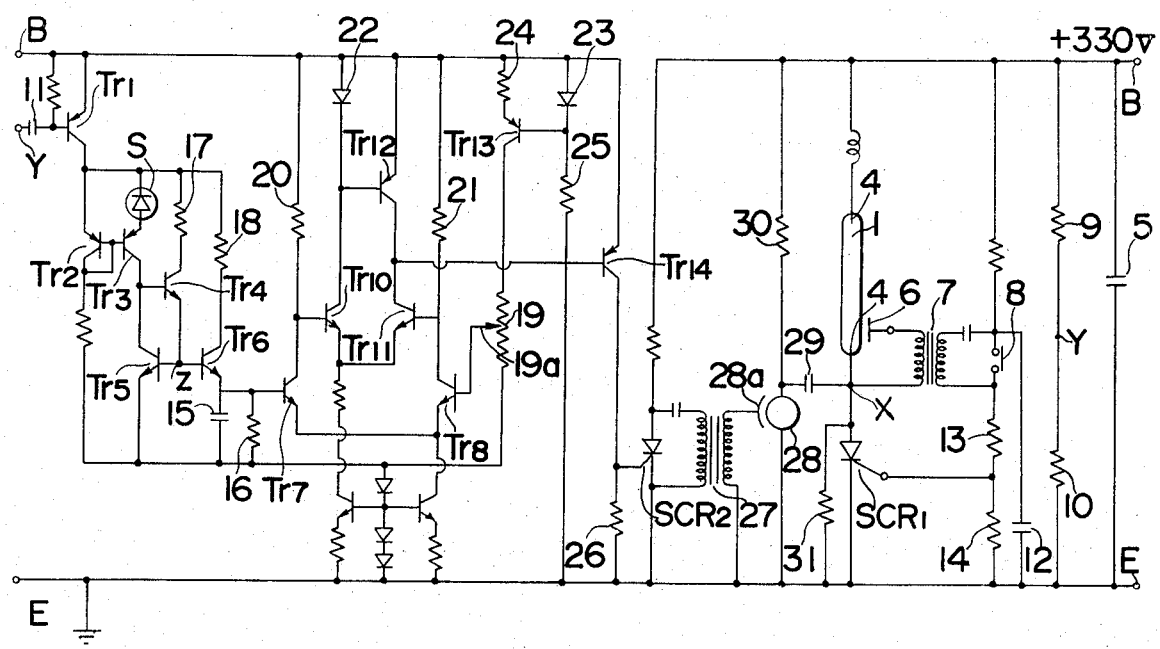

United States Patent [19]
Yata et al.

[11] 3,779,142
[45] Dec. 18, 1973

[54] AUTOMATIC ELECTRONIC FLASH DEVICE

[75] Inventors: Kotaro Yata; Yasuhiro Nanba; Seiji Yamada, all of Osaka, Japan

[73] Assignee: Minolta Camera Kabushiki Kaisha, Osaka-shi, Osaka-fu, Japan

[22] Filed: Jan. 29, 1973

[21] Appl. No.: 327,458

[30] Foreign Application Priority Data
Feb. 28, 1972 Japan.......................... 47/20346

[52] U.S. Cl.............. 95/10 CE, 95/64 R, 315/156
[51] Int. Cl...................... G03b 15/05, H05b 41/14
[58] Field of Search .......... 95/10 C, 10 CE, 10 CT, 95/11, 64; 315/156, 157

[56] References Cited
UNITED STATES PATENTS

| | | | |
|---|---|---|---|
| 3,541,387 | 11/1970 | Ackermann | 315/156 X |
| 3,688,664 | 9/1972 | Mashino | 95/10 CE X |
| 3,685,409 | 8/1972 | Dennewity | 95/10 CE X |
| 3,682,056 | 8/1972 | Tokutomi | 95/10 CE |
| 3,638,543 | 2/1972 | Kondo | 95/10 CE |

*Primary Examiner*—Joseph F. Peters, Jr.
*Attorney*—E. F. Wenderoth et al.

[57] ABSTRACT

An automatic electronic flash device which automatically terminates the flash illumination when a predetermined quantity of light is received from the subject being photographed. A photocell receives the light from the subject and produces a signal which is subsequently logarithmically integrated. The logarithmically integrated signal is compared with a reference signal representative of any selected one of $f$/stops of the camera lens aperture adjusting scale and a quench tube connected in parallel to the flash tube is fired when the integrated signal reaches the level of the reference signal. To this end, there is also provided a linkage system for connecting the lens aperture adjusting scale to a variable resistor for varying the level of the reference signal.

5 Claims, 4 Drawing Figures

AUTOMATIC ELECTRONIC FLASH DEVICE

The present invention relates to an automatic electronic flash device for use in association with still cameras and, more particularly, to an automatic flash device of the type wherein the flash illumination of usually extremely short duration can be controlled in response to an information corresponding to the desired or required setting of a camera diaphragm adjusting scale on the objective assembly of a photographic camera.

The electronic flash device, or strobe as it is so called popularly, is known as a light producing instrument wherein a relatively high voltage charge stored on a capacitor is discharged through a gas-filled flash tube incident to the operation or depression of the shutter release button and at the instant of the taking of a picture. This type of the electronic flash device is still in wide use, but somewhat difficult to handle as much as the flashbulb device utilizing any type of flashbulbs. This type of the electronic flash device may be referred to as a manual one and has many disadvantages and/or inconveniences known to those skilled in the art including lovers of photography.

An automatic electronic flash device is an improved version of the manual one, wherein a photosensitive element or photocell and a flash terminating circuit are additionally provided thereby to deliver the right amount of flash illumination to a target subject to be photographed in response to the amount of light reflected from the target subject on to the photosensitive element. This automatic electronic flash device may possibly be classified into two basic types depending upon the type of the flash terminating circuit: One of which is that the flash terminating circuit comprises a bypass circuit such as disclosed in the U.S. Pat. No. 3,350,603 patented on Oct. 31, 1967, and wherein, if the right amount of flash illumination required during the actual taking of a picture is a part of the maximum amount of flash illumination produceable thereby, the remaining not required is discharged through the bypass circuit and the other is that the flash terminating circuit comprises a switching circuit which acts to cut off the supply of electrical current from the flash capacitor to the flash tube while the electrical charge corresponding to the remaining not required remains on the flash capacitor without being utilized.

However, any of these types of conventional automatic electronic flash devices has an operational disadvantage in that, once the flash device is coupled to, for example, a single-lens reflex camera wherein the shutter speed is fixed at or lower than approximately one-sixieth second by the known reason when the strobe is used in association therewith, a photographer while taking the field of depth or zone of sharpness into consideration cannot select a particular value of lens apertures at will under artificial lightening condition.

Accordingly, an essential object of the present invention is to provide an improved automatic electronic flash device wherein the amount of flash illumination produced thereby can be controlled by the setting of a lens diaphragm or lens aperture adjusting scale, with substantial elimination of the disadvantages and inconveniences inherent in the conventional one of similar kind.

Another object of the present invention is to provide an improved automatic electronic flash device of the above mentioned type wherein means is provided for transmitting an information indicative of the reading of the lens aperture adjusting scale on the objective assembly of a photographic camera to the flash unit circuitry thereby to deliver the right amount of flash illumination to a target subject to be photographed away a given distance from the camera, said right amount of flash illumination being determined by the setting of the lens aperture adjusting scale while the shutter speed is substantially fixed.

A further object of the present invention is to provide an improved automatic electronic flash device of the above mentioned type wherein the flash circuitry includes a variable resistor having a movable tap mechanically, but detachably, coupled with the lens aperture adjusting scale on the camera objective assembly for selectively lengthening and shortening the duration of flash illumination prior to the normal termination of the flash illumination in reference to the amount of light reflected from the target object and in accordance with the setting of the lens aperture adjusting scale.

According to the present invention, the automatic electronic flash device essentially comprises a control circuit for use with an otherwise conventional electronic flash device. This control circuit includes a light controlled electronic switch means for extinguishing the flash in the flash tube prior to the normal termination of the flash. The light from the flash tube is directed toward the target subject to be photographed and light reflected from said target subject falls upon a photosensitive element to produce an electrical signal corresponding to the light energy falling on the photosensitive element. The electrical signal from the photosensitive element is integrated during the interval of the flash, which is subsequently logarithmically suppressed for the purpose as will be mentioned later. When the logarithmically suppressed signal reaches a predetermined value, corresponding to the proper light exposure on the film and which is determined by the setting of the variable resistor operatively coupled with the lens aperture adjusting scale, a control pulse is generated which in turn initiates a short circuit path around the flash tube thereby extinguishing the flash substantially at the instant of the generation of the control pulse. It is to be noted that the light falling on the photosensitive element to produce the control pulse is the one reflected from an object to be illuminated such as the target subject to be photographed. Furthermore, since the time at which the control pulse is generated is controlled by the setting of the variable resistor and, hence, the setting of the lens aperture adjusting scale, a proper light exposure for a given object-to-camera distance can be obtained irrespective of the position of the lens aperture adjusting scale.

The reason that the electrical signal from the photosensitive element is logarithmically suppressed is as follows: As is well known to those skilled in the art, $f$/stops of the aperture adjusting scale are calibrated on an angularly movably carried ring on the camera objective assembly in equidistantly spaced relation with respect to each other and each larger $f$/number admits half the amount of light of the preceding number while each smaller $f$/number conversely admits twice as much light as the preceding one. This progression of $f$/stops is largely standardized in the art and serves to vary precisely the amount of light falling on the film through the lens aperture. While the $f$/stops vary in the manner as hereinbefore described, the use of a variable resistor in the flash unit circuitry, of which resistance varies in a linear function, is obviously undesirable because the voltage across the variable resistor does not faithfully correspond to the amount of light falling on the film through the lens aperture within the range of progression of f/stops unless otherwise the resistance varies in an amount corresponding to any one of the irregular intervals of the f/stops.

On the other hand, the variable resistor of which resistance varies in a linear function according to the position of a movable tap is not only widely manufactured and easily available in the commercial market at a reasonably low cost, but also can be easily manufactured to fit with a desired or required design of circuit component. Accordingly, the use of the variable resistor of the above mentioned type is recommended.

In any event, in order to facilitate the employment of the variable resistor which operates in a linear relation with respect to the setting of the lens aperture adjusting scale, the electrical signal which has been time-integrated and is to be compared with the output from the variable resistor is, according to the present invention, logarithmically suppressed.

Figure 2:
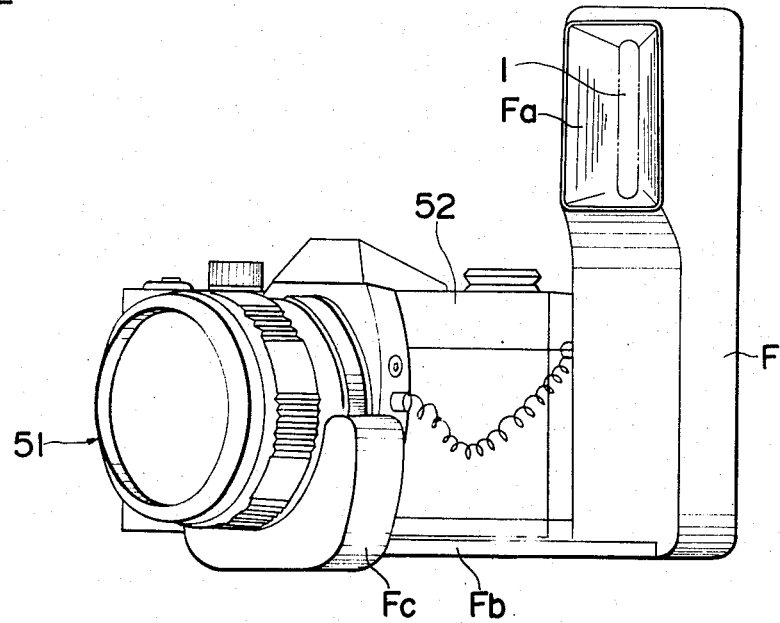
Figure 3:
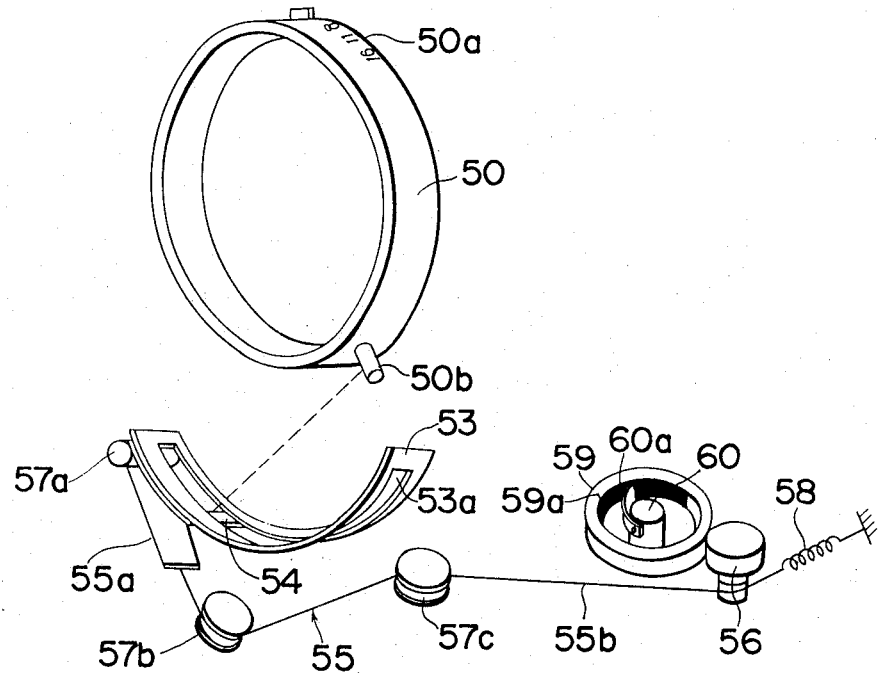
Figure 4:
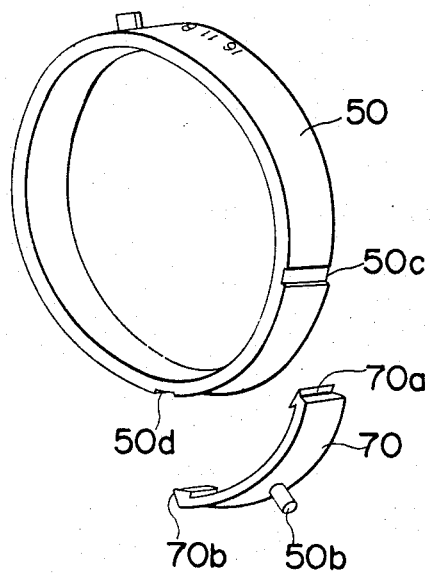

These and other objects and features of the present invention will become apparent from the following description made in conjunction with preferred embodiments with reference to the accompanying drawings, in which;

FIG. 1 is a circuit diagram showing a flash unit circuitry employed in an automatic electronic flash device according to the present invention, FIG. 2 is a schematic perspective view of a photographic camera, for example, a single-lens reflex camera of a focal plane shutter type, to which the flash device constructed according to the present invention is coupled, FIG. 3 is a schematic diagram, in perspective view, showing the detachable mechanical connection between a variable resistor element employed in the flash unit circuitry of FIG. 1 and a lens aperture adjusting ring, and FIG. 4 is a schematic perspective view of the lens aperture adjusting ring showing a coupling member with which the flash device according to the present invention can be operatively coupled to commercially available still cameras of any make, said coupling member being detachably mounted on said lens aperture adjusting ring.

Referring now to FIG. 1 in more detail, there is shown a control circuit for controlling the flash duration of a light flash provided in an electronic photoflash mechanism. A gas-filled flash tube 1 is provided with a pair of main current conducting electrodes 2. The electrodes 4 are connected, respectively, to opposite electrodes of a main storage capacitor 5. A trigger electrode 6 is positioned adjacent, but external, to the flash tube 2 and connected through a trigger transformer 7 to a control switch 8 such as the switch associated with the shutter on photographic cameras.

The circuit so far described is of any conventional one and the details of operation of this circuit is herein omitted for the sake of brevity. In brief, a known electronic circuit (not shown) establishes a relatively high voltage charge across the storage capacitor 5. The stored voltage also appears across the electrodes 4 of the flash tube 1. When it is desired to produce a flash of light from the flash tube 1, a trigering pulse is produced through the transformer 7 incident to the closure of the switch 8 and applied to the trigger electrode 6 of the flash tube 1.

Under normal operations heretofore, the flash continues until the capacitor 5 has discharged through the flash tube 1 to the point where the voltage will no longer support the flash across the flash tube 1, which usually requires about one milisecond of time. According to the present invention, the maximum time duration of the flash produced across the flash tube 1 remains at that time determined by the discharge of the capacitor 5 through the flash tube 1. However, in order to automatically adjust the flash for those instances wherein the object requires less than the maximum amount of light produceable by the full discharge of voltage stored on the capacitor 5 through the flash tube 1, a control circuit is provided for extinguishing the flash at some desired point short of the maximum duration of flash illumination, i.e., prior to the normal termination of the flash illumination.

In practising the present invention and referring still to FIG. 1, a common junction, as at Y, between a pair of series connected resistors 9 and 10 which are connected with a power source such as of, for example, 330 volts, in parallel relation to the main storage capacitor 5 is connected with the cathode of a photocell S through a capacitor 11 and then a switching transistor Tr1. This switching transistor Tr1 is rendered conductive upon receipt of a bias voltage through the capacitor 11 at the instant of voltage drop occurring at the common junction Y. This voltage drop at the common junction Y takes place upon discharge of the capacitor 5 through the flash tube 1 and at the initiation of the flash.

It is to be noted that, simultaneous with the charging of the main storage capacitor 5, a capacitor 12 connected in parallel to the capacitor 5 and also to the switch 8 is charged. Voltage stored on the capacitor 12 is, upon closure of the switch 8, discharged through a pair of series connected resistors 13 and 14 which are connected in series with the switch 8. Consequently, voltage appears across the resistor 14 upon discharge of the capacitor 12, which is in turn applied to the gate terminal of a silicon controlled rectifier or thyristor SCR1, connected in series with the flash tube 1, thereby to switch the thyristor SCR1 to the conductive state, thus permitting the flash tube 1 to be ignited at the time of application of the triggering pulse supplied through the transformer 7 to the trigger electrode 6.

The photocell S acts to supply current from the transistor Tr1 to the base of an amplifying transistor Tr4 and also to the collector of a switching transistor Tr5 through an amplifying transistor Tr3, the amount of said current being correspondent to the magnitude of an incident pulse of reflected light energy originating from said flash tube 1.

A transistor Tr2, connected in parallel to a series circuit composed of the photocell S, the transistor Tr3 and the transistor Tr5, exhibits a characteristic similar to the diode characteristic and can be triggered on only when voltage supplied to the photocell S exceeds the rated value of said photocell S, thereby avoiding a possible damage of said photocell S.

In the arrangement so far described, the current flowing across the amplifying transistor Tr4 to a common junction between the bases of respective transistors Tr5 and Tr6 is, by the amplifying action of the transistor Tr4, substantially equalized to the current flowing across the amplifying transistor Tr3 to the collector of the switching transistor Tr5. Therefore, it is clear that the base-emitter voltage of the transistor Tr5 is, since the emitter current of said transistor Tr4 is an exponential function of the base-emitter voltage, possibly expressed by the following equation.

$$Io = Ke^{\alpha Vo} \tag{1}$$

wherein $Io$ represents a collector current of the transistor Tr5 and $Vo$ represents the base-emitter voltage of said transistor Tr5.

Although the transistor Tr6 acts to permit the flow of current of a value substantially equal to the current $Io$ from the transistor Tr1 therethrough upon establishment of the conductive state in the transistor Tr1, the base-emitter voltage of the transistor Tr6 decreases as a capacitor 15, connected between the emitters of the respective transistors Tr5 and Tr6, is charged. Correspondingly, the emitter current of said transistor Tr6 decreases. The voltage $V$ stored on the capacitor 15 has the following relationship with respect to the emitter current $I$ of said transistor Tr6.

$$V = 1/C \int I \, dt \tag{2}$$

wherein $C$ represents the capacitance of the capacitor 15.

Since the emitter current $I$ of the transistor Tr6 is an exponential function of the base-emitter voltage $Vo$ of the transistor Tr5, the following equation can be obtained.

$$I = Ke^{\alpha (Vo - V)} \tag{3}$$

From the equations (2) and (3) above, $$V = K/C \cdot e^{\alpha Vo} \int e^{-\alpha V} dt \tag{4}$$

If the both terms of the equation (4) above are differentiated, the following can be obtained.

$$\dot{V} = K/C \cdot e^{\alpha Vo} \cdot e^{-\alpha V} \tag{5}$$

It is to be noted that, in the equation (5) above, the voltage $Vo$ is assumed constant.

The equation (5) above may be modified as follows:

$$e^{\alpha V} \cdot \dot{V} = K/C \cdot e^{\alpha Vo} \tag{6}$$

The left term of the equation (6) above may be modified and hence, $$1/\alpha \cdot d/dt \cdot e^{\alpha V} = K/C \cdot e^{\alpha Vo} \tag{7}$$

If the equation (7) above is integrated, then, the following equation can be obtained.

$$1/\alpha \cdot e^{\alpha V} = K/C \cdot e^{\alpha Vo} \cdot t + A \tag{8}$$

wherein, since $V = 0$ when the time $t = 0$, $A = 0$.

The logarithm of the equation (8) above is as follows:

$$V = \alpha Vo + \log K\alpha/C \cdot t \tag{9}$$

From the equation (1) above, the following can be obtained.

$$\alpha Vo = \log Io/K \tag{10}$$

By substituting the equation (10) above into the equation (9), $$V = \log Io/K \cdot K\alpha/C \cdot t = \log \alpha/C \cdot Io \cdot t \tag{11}$$

While the foregoing has been made on the assumption that the current $Io$ is constant, the voltage $V$ stored on the capacitor 15 can be obtained by the following equation provided that the current $Io$ varies in accordance with the time elapsed.

$$V = \log (\alpha/C \cdot \int Io \cdot dt)$$

In other words, the voltage $V$ stored on the capacitor 15 corresponds to an output signal from the photocell S, i.e., a signal indicative of the integration of the reflected light energy with respect to the time elapsed, which is logarithmically suppressed.

The logarithmically integrating circuit, composed of the transistors Tr4, Tr5 and Tr6, resistors 16, 17 and 18, and the capacitor 15, is designed such as to operate in the manner as hereinbefore described by the previously mentioned reason, that is, because of the employment of a variable resistor 19 having a linear characteristic.

It is to be noted that a time constant circuit composed of the capacitor 15 and a resistor 16 in parallel to the capacitor 15 is designed such as to have a time constant greater than the duration of flash illumi-nation produced by the flash tube 1.

The output responsive circuit means comprises a comparision circuit unit including a first differential amplifier circuit and a second differential amplifier circuit, and a preset circuit unit.

The first differential amplifier circuit includes a pair of parallelly connected switching transistors Tr7 and Tr8 and resistors 20 and 21 while the second differential amplifier circuit includes a switching transistor Tr10, a diode element 22 connected in series with the transistor Tr10 and a series circuit composed of a switching transistor Tr11 and a switching transistor Tr12.

The transistor Tr7 has the emitter connected with the emitter of the transistor Tr8 and the collector connected with the base of the transistor Tr10. The transistor Tr11 has the base connected with the collector of the transistor Tr8, the emitter connected with the emitter of the transistor Tr10, and the collector connected with the collector of the transistor Tr12 having the base connected with the collector of the transistor Tr10.

The preset circuit unit includes the variable resistor 19 having a movable tap 19a connected with the base of the transistor Tr8 for supplying a reference voltage of a predetermined value, which may vary depending upon the positioning of the movable tap 19a, to the base of said transistor Tr8. As stated above, this variable resistor 19 exhibits the linear characteristic and the reference voltage, therefore, varies as a function of the positioning of the movable tap 19a. As will be mentioned later, this variable resistor 19 is mechanically linked with the lens aperture adjusting ring on the objective assembly of a photographic camera so that an information corresponding to any selected one of the lens apertures or f/stops can be set to the flash unit circuitry.

The preset circuit unit further includes a series circuit composed of a switching transistor Tr13 and a resistor 24 and another series circuit composed of a diode element 23 and a resistor 25. The transistor Tr12 has the base connected with a common junction between the diode element 23 and the resistor 25, the emitter connected with the resistor 24 and the collector connected with the collector of the transistor Tr1 through the variable resistor 19.

In the arrangement so far described, it is to be noted that, prior to the charging of the capacitor 15, the base voltage of the transistor Tr7 is lower than the base voltage, i.e., the reference voltage, of the transistor Tr8 and, hence, the collector potential of the transistor Tr7 is higher than that of the transistor Tr8. Consequently, the transistor Tr10 is in the conductive state while the transistor Tr11 is in the non-conductive state.

As the capacitor 15 is charged and the base potential of the transistor Tr7 subsequently exceeds the reference voltage applied to the base of the transistor Tr8, the states of the transistors Tr10 and Tr11 are respectively reversed. At this time, the transistor Tr12 is triggered on whereby a bias voltage can be applied to the base of a transistor Tr14 permitting the latter to be conducted.

The output responsive circuit means further comprises a flash extinguishing circuit including the switching transistor Tr14, a resistor 26, a silicon controlled rectifier or thyristor SCR2, a trigger transformer 27, a quench or switch tube 28, a capacitor 29 and the thyristor SCR1. In this flash extinguishing circuit, when the switching transistor TR14 is triggered on in the manner as hereinbefore described, voltage appearing across the resistor 26 is applied to the gate terminal of the thyristor SCR2 to switch the latter to the conductive state so that a triggering pulse can be generated from the transformer 27. The triggering pulse thus generated from the transformer 27 is applied to a trigger electrode 28a of the quench tube 28 to complete a short circuit for the flash tube 1, thereby permitting the latter to extinguish the flash illumination.

It is to be noted that, prior to the completion of the short circuit for the flash tube 1 via the quench tube 28, the capacitor 29 is charged through the resistors 30 and 31 with voltage of a value substantially equal to the power source voltage. Subsequently, upon completion of the short circuit via the quench tube 28, the voltage at the common junction X becomes negative and, accordingly, the thyristor SCR1 that has been in the conductive state is immediately switched off whereby flash illumination produced by the flash tube 1 extinguishes.

The flash extinguishing circuit so far described may be replaced by the known bypass circuit, in which case the bypass circuit must be arranged in parallel relation to the flash tube 1.

Referring now to FIGS. 2 to 4, there is shown a linkage system between the lens aperture adjusting ring 50 on the objective assembly 51, either fixedly or detachably, mounted on the body of a photographic camera 52, and the variable resistor 19.

In FIG. 2, there is shown an outer appearance of the flash device detachably coupled with the photographic camera, for example, a single-lens reflex camera. The flash device includes a flash unit housing F accommodating therein the flash unit circuitry of the construction as hereinbefore fully disclosed. The flash unit housing F has an upper end portion formed with a window Fa through which the gas filled flash tube 1 is exposed so as to transmit flash illumination frontwardly of the camera body 52, and a lower end portion formed with a transverse bracket Fb, one end portion of which is, either rigidly or foldably, connected with that portion of the housing F and the opposite end portion is rigidly mounted with a casing Fc so sized as to sufficiently shield internal linkage mechanisms as will be mentioned later. It is to be noted that, for operatively accommodating parts of the internal linkage mechanisms, the transverse bracket Fb to be detachably attached to the body of the camera 52 is provided with a hollow spacing therein.

As clearly shown in FIG. 3, the lens aperture adjusting ring 50 is calibrated with f/stop numbers as at 50a which are equidistantly spaced with respect to each other. This ring 50 has a pin 50b secured to a portion of the outer peripheral surface thereof.

Fixedly housed within the casing Fc is a guide member 53 curved to establish a parallel relation to the outer peripheral surface of the ring 50 and formed with a guide slot 53a extending in the lengthwise direction of said guide member 53 for engagement with the pin 51b.

The guide member 53 slidably carries a slider member 54 which is slidable in the lengthwise direction of the guide slot 53a or the guide member 53, in a manner as will be described later, with the lengthwise direction thereof across said guide slot 53a. This slider member 54 is associated with an actuating roller 56 by means of a linkage member 55 extending from said slider member 54 to said actuating roller 56 via a plurality of deflectors 57a, 57b and 57c, such as pins or rollers, rigidly carried respectively within the casing Fc and the bracket Fb, said actuating roller 56 being rotatably carried within the housing F.

The linkage member 55 comprises a flexible strip member 55a of a width substantially equal to or less than the length of the slider member 54 has one end rigidly connected with said slider member 54, a length of wiring 55b having one end rigidly connected with the other end of said strip member 55a, and a tension spring 58 having one end rigidly connected with the other end of said wiring 55b, the other end of said tension spring 58 being rigidly connected with a suitable framework within the housing F. The flexible strip member 55a may be omitted, in which case that end of the wiring 55b is directly connected with the slidable member 54, provided that the latter is steadily slidably carried by said guide member 53.

Movment of the linkage member 55 in the lengthwise direction thereof causes the actuating roller 56 to rotate about the axis of rotation thereof. For this purpose, a portion of the wiring 55b adjacent to that end thereof connected with the tension spring 58 is wound round the actuating roller 56. The tension spring 58 acts not only to maintain the strip member 55a and the wiring 55b under tension, but also to bias the slidable member 54 in one direction.

In the arrangement so far described, when the flash device is coupled with the photographic camera and the lens aperture adjusting ring 50 is subsequently turned so as to register, for example, each larger f/number with the index (not shown) calibrated on the objective assembly 51, the corresponding angular movement of the pin 50b is transmitted to the slidable member 54 with said pin 50b in engagement with said member 54, thus permitting the slidable member 54 to move counter to the pulling direction of the tension spring 58. On the other hand, when the ring 50 is turned so as to register each smaller f/number with the index, the slidable member 54 pulled by the tension spring 58 follows the angular movement of the pin 50b. As stated above, the movement of the slidable member 54 is transmitted to the actuating roller 56 through the likage member 55.

With the above in mind, disposed in the vicinity of the actuating roller 56 is a rotatable ring element 59 suitably carried by the framework within the housing F, the outer peripheral surface of said ring element 59 constantly contacting the actuating roller 56 whereby a rotational force of the actuating roller 56 can be transmitted to the rotatable ring element 59. The ring element 59 has a resistance material 59a coated on a portion of the inner peripheral surface thereof, said resistance material 59a corresponding to the variable resistor 19 shown in FIG. 1.

An equivalent of the movable tap 19a of the variable resistor 19 of FIG. 1 is shown in the form of a metallic brush 60a secured to a stud member 60 suitably carried by the framework within the housing F.

From the foregoing, it has now become clear that, as the ring element 50 is rotated about the axis of the stud member 60, the reference voltage to be applied to the base of the transistor Tr8 varies.

It is to be noted that, in the case where the flash unit circuitry is desired not only to adjust to a selected one of the lens apertures or f/stops, but also to a desired or required one of film speeds of various, commercially available films, the stud member 60 may be made rotatable about the axis thereof and, then, connected with a suitable film speed control scale. If this is not required, without utilizing the stud member 60, the brush 60a may be rigidly connected with the actuating roller 56 while the ring element 59 is aligned with said actuating roller 56.

Alternatively, the resistance material 59a that has been described as coated on the inner peripheral surface of the ring element 59 may be coated on the peripheral surface of the stud member 60 while the brush 60a is rigidly secured to the ring element 59.

FIG. 4 shows an alternative method of connecting the pin 50b to the lens aperture adjusting ring 50. In this embodiment, the pin 50b is secured to an angular member 70 having both ends formed with engagements 70a and 70b of substantially T—shape. The ring 50 is formed with a pair of spaced engagement grooves 50c and 50d for respectively receiving therein the engagements 70a and 70b.

The arrangement of FIG. 4 is particularly advantageous when the pin 50b is desired to be connected with the lens aperture adjusting ring after the objective assembly 51 including the lens aperture adjusting ring has been completely assembled.

From the foregoing description of the present invention, it is clear that the photographer can appreciate the depth of field or zone of sharpness, which is controllable as desired, under artificial lightening condition by the use of the flash device.

The present invention being thus fully described, it will be obvious that the same may be varied in many ways. Such variations are not to be regarded as a departure from the spirit and scope of the present invention, and all such modifications are intended to be included within the scope of the present invention.

What is claimed is:

1. In an automatic electronic flash device, the improvement which comprises an illuminating circuit means including a flash capacitor and a flash tube for selectively artificially illuminating a subject to be photographed by means of said flash tube upon discharge of voltage stored on said flash capacitor; a light measuring circuit means responsive to an incident pulse of reflected light energy originating from said flash tube to produce an electrical signal indicative of the amount of said reflected light energy; a time integrating circuit means responsive to said electrical signal for integrating the latter and to produce an output signal; a triggering circuit means connected to said light measuring circuit means and responsive to said output signal to produce a trigger pulse when said output signal reaches a predetermined value; means for varying said predetermined value of said output signal in accordance with an information indicative of a selected one of f/stops of an lens aperture adjusting ring on the objective assembly of a photographic camera; a switch circuit means responsive to the trigger pulse for terminating the flash illumination; and coupling means for operatively coupling said lens aperture adjusting ring with said varying means to transmit said information to said varying means.

2. An automatic electronic flash device as claimed in claim 1, further comprising means for logarithmically suppressing said output signal from said integrating circuit means.

3. An automatic electronic flash device as claimed in claim 1, wherein said varying means comprises an electrical variable resistor.

4. An automatic electronic flash device as claimed in claim 1, wherein said varying means comprises an electrical variable resistor having a resistive element of a linear characteristic and a movable tap, and wherein said coupling means comprises a mechanical linkage system including means for detachably and operatively connecting said lens aperture adjusting ring and said variable resistor whereby rotation of the lens aperture adjusting ring causes the tap of said variable resistor to slide on the resistive element in a linear relation to said rotation of said lens aperture adjusting ring.

5. In an automatic electronic flash device for use in association with a photographic camera having an objective assembly provided with a camera lens aperture adjusting ring rotatably mounted thereon, the improvement which comprises an illuminating circuit means including a flash capacitor and a flash tube for selectively artificially illuminating a subject to be photographed by means of said flash tube upon discharge of voltage stored on said flash capacitor; a light measuring circuit means responsive to an incident pulse of reflected light energy originating from said flash tube to produce an electrical signal indicative of the amount of said reflected light energy; a time integrating circuit means responsive to said electrical signal for integrating the latter and to produce an output signal; and a triggering circuit means connected to said light measuring circuit means and responsive to said output signal to produce a trigger pulse when said output signal reaches a predetermined value.

* * * * *